(12) United States Patent
Lal et al.

(10) Patent No.: US 8,147,659 B2
(45) Date of Patent: Apr. 3, 2012

(54) GATED ELECTRODES FOR ELECTROLYSIS AND ELECTROSYNTHESIS

(75) Inventors: Rakesh K. Lal, Isla Vista, CA (US); Likun Shen, Goleta, CA (US); Umesh Kumar Mishra, Montecito, CA (US)

(73) Assignee: The Regents of the University of California, Oakland, CA (US)

( * ) Notice: Subject to any disclaimer, the term of this patent is extended or adjusted under 35 U.S.C. 154(b) by 676 days.

(21) Appl. No.: 11/943,363

(22) Filed: Nov. 20, 2007

(65) Prior Publication Data
US 2008/0116080 A1 May 22, 2008

Related U.S. Application Data

(60) Provisional application No. 60/866,560, filed on Nov. 20, 2006.

(51) Int. Cl.
*C25B 9/04* (2006.01)
*C25D 17/00* (2006.01)
(52) U.S. Cl. ............... 204/228.9; 204/229.5; 204/229.6; 204/230.6; 204/224 R; 205/96; 205/97; 205/103; 205/104; 429/498; 429/499; 429/500; 429/501
(58) Field of Classification Search ............... 205/96, 205/97, 103, 104; 204/224 R, 228.9, 229.5, 204/229.6, 230.6, DIG. 7; 429/498, 499, 429/500, 501
See application file for complete search history.

(56) References Cited

U.S. PATENT DOCUMENTS

| 4,044,939 | A | 8/1977 | Horst et al. | |
|---|---|---|---|---|
| 6,797,769 | B2 | 9/2004 | Akutsu et al. | |
| 6,824,656 | B2 * | 11/2004 | Dalmia et al. | 204/266 |
| 2005/0145499 | A1 * | 7/2005 | Kovarsky et al. | 205/103 |
| 2005/0158704 | A1 * | 7/2005 | Tyvoll et al. | 435/4 |
| 2006/0121700 | A1 * | 6/2006 | Peng et al. | 438/483 |
| 2006/0138456 | A1 * | 6/2006 | Parikh et al. | 257/194 |

OTHER PUBLICATIONS

PCT/US2007/24264 International Search Report and Written Opinion.

* cited by examiner

*Primary Examiner* — Bruce Bell
(74) *Attorney, Agent, or Firm* — Gates & Cooper LLP (57) ABSTRACT

A gated electrode structure for altering a potential and electric field in an electrolyte near at least one working electrode is disclosed. The gated electrode structure may comprise a gate electrode biased appropriately with respect to a working electrode. Applying an appropriate static or dynamic (time varying) gate potential relative to the working electrode modifies the electric potential and field in an interfacial region between the working electrode and the electrolyte, and increases electron emission to and from states in the electrolyte, thereby facilitating an electrochemical, electrolytic or electrosynthetic reaction and reducing electrode overvoltage/overpotential.

27 Claims, 5 Drawing Sheets

FIG. 1(a)

PRIOR ART

FIG. 1(b)

PRIOR ART

GATED ELECTRODES FOR ELECTROLYSIS AND ELECTROSYNTHESIS

CROSS-REFERENCE TO RELATED APPLICATIONS

This application claims the benefit under 35 U.S.C. Section 119(e) of the following co-pending and commonly-assigned U.S. patent application:

U.S. Provisional Application Ser. No. 60/866,560 filed on Nov. 20, 2006, by Rakesh K. Lal, Likun Shen and Umesh K. Mishra, entitled "GATED ELECTRODES FOR ELECTROLYSIS AND ELECTROSYNTHESIS,";

which application is incorporated by reference herein.

STATEMENT REGARDING FEDERALLY SPONSORED RESEARCH AND DEVELOPMENT

This invention was made with Government support under Grant No. N00014-01-1-0764 awarded by the ONR MINE MURI program. The Government has certain rights in this invention.

BACKGROUND OF THE INVENTION

1. Field of the Invention

This invention is related to designing gated electrode structures that aim to reduce overvoltages in electrochemical and photoelectrochemical cells by altering the field in the electrolyte near an electrode.

2. Description of the Related Art

Hydrogen is expected to become an important energy storage medium for renewable energy sources which have a fickle output due to variability of environmental factors and for mobile applications such as transportation. Cost effective techniques for obtaining hydrogen from water is a prerequisite for the hydrogen economy and several approaches are being explored. Electrolysis appears to be among the more attractive schemes for splitting water. Electrolysis could be applied directly at photoelectrodes, or electrical energy could be produced by solar cell arrays, wind turbines, or other means, and hydrogen produced by electrolysis in an electrochemical cell.

Figure 1A:
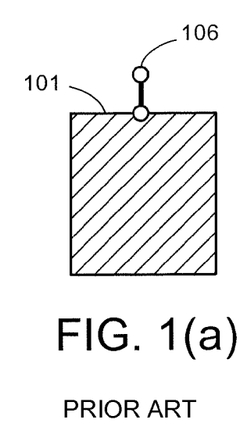
FIG. 1(a) shows the face of a conventional electrode (the cathode in this case) that might be used in the conventional cell shown in FIG. 1(b)
Figure 1B:
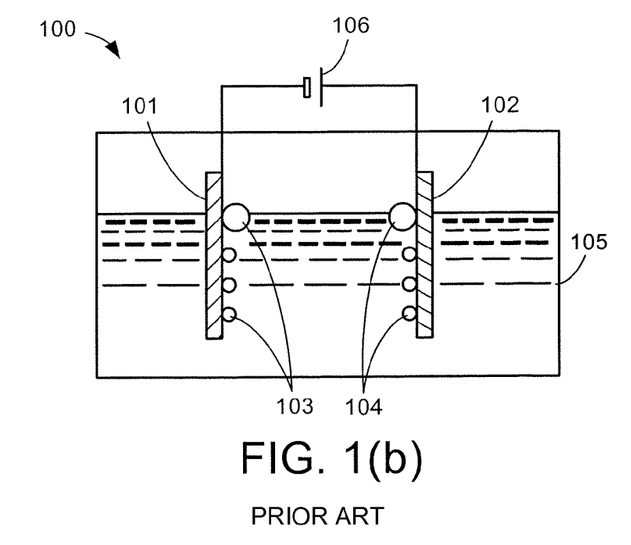

The schematic of a conventional electrochemical cell (100) for the electrolysis of water is shown in FIGS. 1(a)-(b). Ionic currents flow through the cell (100) and electron transfer occurs at the electrodes (101,102), such that hydrogen (103) is produced at the cathode (101) and oxygen (104) is produced at the anode (102) with appropriate choices of the electrolyte (105) and cell voltage (106). In the conventional cell (100), an electrode (101,102) is made of one material that might be a composite. FIG. 1(a) shows a face view of the electrode (101) and FIG. 1(b) shows an edge view of the electrodes (101) and (102).

For a working electrode which is an anode, electrons transfer from the electrolyte to the anode. For a working electrode which is a cathode, electrons transfer from the cathode to the electrolyte.

The standard potential for splitting water at 25° C. under 1 atmosphere (atm) pressure is 1.23 V. However, due to the various over-voltages required, the voltage across a cell with platinum electrodes and saturated sodium hydroxide (NaOH), for example, as electrolyte is about 2.0 V at room temperature for an electrolysis current density of 100 mA $cm^{-2}$ (this voltage can be reduced to ~1.6 V if the cell is operated at 125° C.). In fact, at room temperature, the operating cell voltage common for electrolysis of water is over 2 V, which is much higher than the thermodynamic standard potential of 1.23 V for splitting water. Therefore, lowering electrode overvoltage is very desirable for improving overall efficiency of these systems.

In the photoelectrode cell configuration, either one or both electrodes could be made of semiconducting material so that the photovoltaic effect can be utilized for generating the electromotive force (emf) used in driving electrolysis. With a single photoelectrode in a photoelectrochemical cell, it is necessary that the total cell potential needed for electrolysis be created in that electrode. This means that the photoelectrode should be made with a semiconducting material that has a bandgap greater than about 2.5 eV, if the voltage for electrolysis is about 2.0 V. This drastically reduces the number of photons available for the generation of photocurrent, and a tandem cell electrode design, or two cells in series, is required. In the case of pure electrochemical cells for electrolysis, overvoltages reduce conversion efficiencies. Hence, the need to design electrode structures that reduce cell overvoltages.

Several approaches have been found, in the open literature and patents, for reducing cell overvoltages at the electrodes. These have included (a) forming nanostructured coatings, such as covering the electrode surface with material such as platinum black, nanostructured alloys, nanostructured oxide semiconductors, carbon nanotubules, carbon nanotube (CNT) composite with other materials, nanotubular and porous semiconductors, and nanocomposites with fullerenes and conducting polymers, (b) using low work function metals, (c) using Metal-Insulator-Metal (MIM) tunnel structures to facilitate electron transfer to the radical that captures the electron to produce hydrogen, and (d) partially coating the surface with a hydrophobic layer to facilitate hydrogen evolution. Besides working on electrodes and electrolytes most appropriate for electrolysis, researchers have also investigated pulsed sources for electrolysis. However, to date, stainless steel for the cathode, nickel or platinized nickel for the anode, with saturated KOH or NaOH as the electrolyte, has been the standard cell configuration for industrial cells for the electrolysis of water.

In metal cathodes, electron transfer occurs from energies near the Fermi level of the metal to the highest energy states available in the electrolyte around the Fermi energy, when single step tunneling is possible, or by multi-step tunneling. Metal cathodes are not efficient photocathodes. Semiconductors can serve as cathodes as well as photocathodes.

Figure 2A:
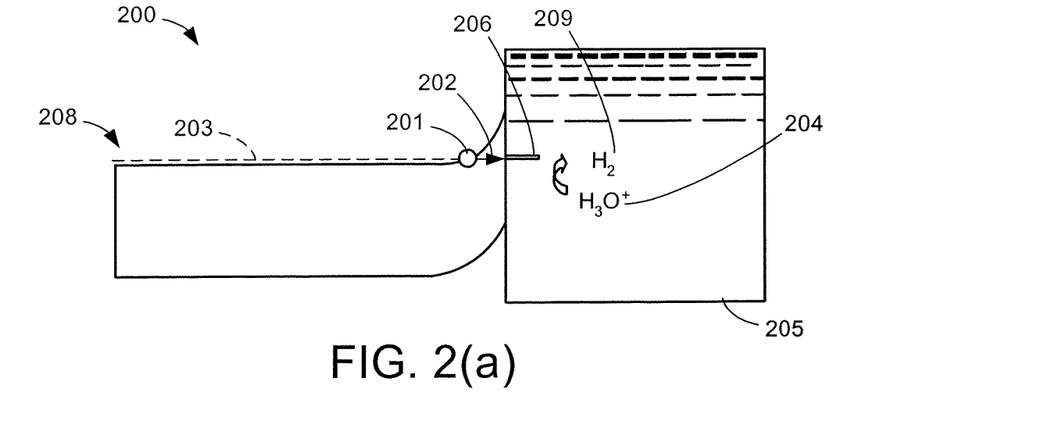
FIG. 2(a) is a band diagram of a semiconductor cathode made from a degenerate n-type semiconductor and using tunnel electron transfer to surface states and then the hydronium ion.
Figure 2B:
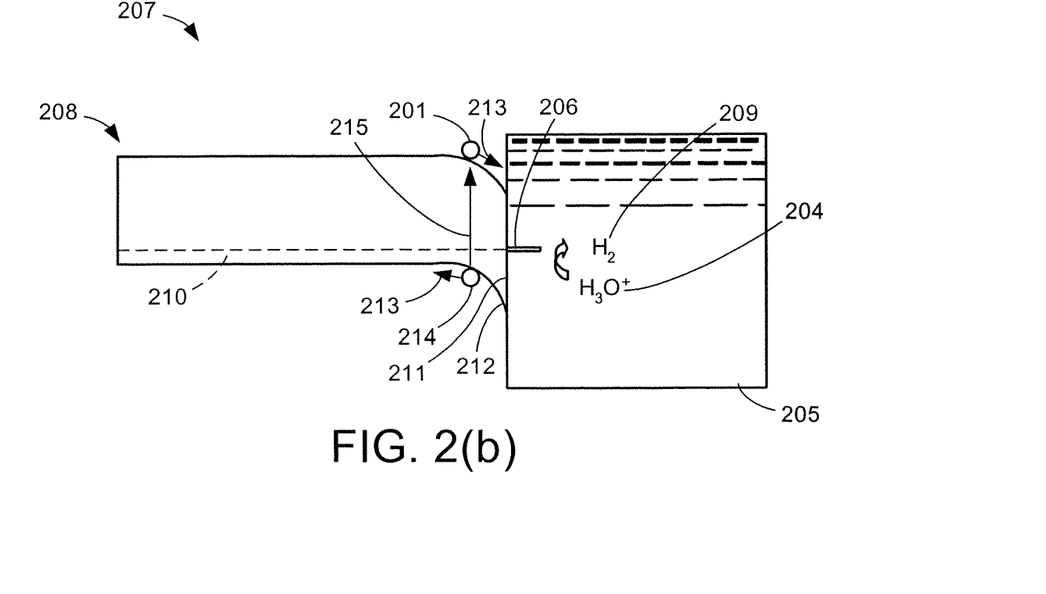
FIG. 2(b) is a band diagram of conventional photocathodes made with p-type semiconductor.

FIGS. 2(a) and 2(b) are band diagrams. FIG. 2(a) shows a band diagram (200) of a semiconductor cathode made of a degenerate n-type semiconductor, wherein electrons (201) transfer (202) to surface states (203) and then to the hydronium ion(s) (204) in the electrolyte (205) (the present invention has just shown the hydronium ion as a possible radical to which electron transfer occurs for electrolysis, however, the level (206) to which electrons tunnel is still a subject of debate). FIG. 2(b) shows a band diagram (207) of conventional photocathodes made with p-type semiconductors.

FIGS. 2(a) and 2(b) show how semiconductor cathodes, in general, use the higher energy of electrons (201) in the conduction band (208) of the semiconductor to facilitate transfer (202) of electrons (201) to the radical (204), and the radical (204) decomposes to give hydrogen (209).

FIG. 2(a) shows how n-type semiconductors require to be heavily doped, in order to facilitate tunnel injection (202) of electrons (201) to surface states (203) and then to the radical (204) (for example, to the hydronium level(s) (206) involved with electrolysis).

The band diagram (207) of semiconductor photocathodes is shown in FIG. 2(b). FIG. 2(b) shows how photocathodes most widely discussed in literature use p-type material and utilize surface charges (210), at the semiconductor electrolyte interface (211), for the band bending (212) that brings about charge separation (213) of the electrons (201) and holes (214). The arrow (215) represents photoexcitation in the photocathode that with subsequent charge separation creates the cell current and voltage between the cathode and anode.

For both structures, shown in FIG. 2(a) and FIG. 2(b), the band bending (212) is determined by the semiconductor|electrolyte junction (211). The degenerately doped n-type semiconductor cathode does not seem to offer any special advantage over the metal cathode, although the degenerately doped n-type semiconductor cathode does provide a higher energy level for electrons compared to stainless steel. There is little discussion about this in the literature. N-type semiconductors with lower doping have been used as photo-anodes but have problems with oxidation. P-type semiconductors have been widely investigated for photocathodes.

Because the band bending is controlled by the semiconductor|electrolyte junction (211), there are some drawbacks in the overall concept in both schemes:

(a) the built-in voltage and field that bring about carrier separation are due to surface effects that are less reproducible, and the built-in voltage is lower than can be obtained with semiconductor homo-junctions or heterojunctions made on a substrate with a certain bandgap, (b) the energy level for electron transfer to the hydronium ion is not optimized and results in an overvoltage, and (c) the electric field in the electrolyte next to the semiconductor|electrolyte interface is controlled by the surface charge and depletion charge in the semiconductor and is often controlled by the former.

Use of nano-structured coatings helps increase the surface area and possibly local fields near sharp tips or nano-structured couples/half-cells. However, the nano-structured coatings do not significantly improve performance, i.e. reduce overvoltage at high current densities, over that of conventional metal electrodes. This is because none of the schemes listed above directly address the problem of altering the field and potential distribution in the electrolyte next to an electrode, and this is a parameter that needs investigation.

The present invention addresses the problem by designing electrodes that are sandwiches of several layers of materials, to form various classes of gated electrode structures that aim to reduce overvoltages by altering the charge, field and potential distribution in the electrolyte near the electrode.

SUMMARY OF THE INVENTION

The present invention discloses a gated electrode structure for altering the electric charge, field and potential distribution in an electrolyte near at least one working electrode. This alteration of electric parameters may be achieved in the following ways. Any two electrodes may be used as anode and cathode with one or more additional electrode(s) being the gate electrode. Steady state or time varying voltages may be applied to achieve the desired action. Proximity of the electrodes will enhance these effects.

For example, a gated electrode structure for altering electrode overvoltage may comprise at least one working electrode for transferring charge to or from the electrolyte and at least one gate electrode appropriately spaced from the working electrode, so that a relative bias between the gate electrode and the working electrode alters the electric charge, field and potential in an interfacial region between the working electrode and the electrolyte, and modifies the working electrode potential, wherein the gate electrode and working electrode are spaced appropriately for these effects to occur (i.e. the gate electrode and working electrode are appropriately spaced such that the gate electrode can modify the working electrode's surface charge, field and potential). The gated electrode structure may comprise an array of two or more of working or gating electrodes.

Applying an appropriate gate voltage relative to the working electrode modifies the electric charge density, field and potential at one or more surfaces of the working electrode and increases charge transfer between the working electrode and states in the electrolyte (for example, increases electron emission from the working electrode to states in the electrolyte), thereby facilitating electrochemical, electrolytic or electrosynthetic reactions. In one embodiment, the working electrode is a cathode, and a static or dynamic bias on the gate electrode affects the electric charge, field and potential distribution near the cathode. The gate electrode may be a counter electrode in some part of the gating cycle. The relative bias may be floating, static or time varying.

The gated electrode structure may further comprise a coplanar interdigitated gated electrode, an encircling or overlapping gate electrode array, a gated interdigitated electrode on a semiconductor substrate with and without polarization, one or more stripe electrodes, and a substrate gated MIM structure. The gated electrode structure may be MIM or Metal-Insulator-Semiconductor (MIS) structure with a fringing field between the metals of the MIM structure or between the metal and the semiconductor of the MIS structure. In this case, the gate electrode and the working electrode may be separated by an insulating layer to form a MIM or MIS structure, and the working electrode may be a metal, semimetal or a semiconductor. Non-coplanar and remote gate configurations are also possible. The working electrode or gated electrode may be overhanging or suspended and the working electrode and gated electrode may be made on two different substrates and suitably appositioned.

The electrodes may be interchanged to function either as an anode, cathode, or gate, including one or more electrode being remote. More than one electrode may function as a gate, and each of the gates may be at different potentials. More than one electrode may function as a cathode. More than one electrode may function as an anode. Bias applied to any of the electrodes may be steady state or time varying.

The present invention also discloses a method for reducing overvoltages in electrochemical and photoelectrochemical cells, (or in electrochemical, electrolytic, or electrosynthetic reactions) by modifying the electric charge, field and potential in the electrolyte near the electrode (more specifically, in an interfacial region between an electrolyte and one or more electrodes). The modification may use appropriately spaced electrodes or a fringing field between a semiconductor and a Schottky contact or heterojunction. The field may be enhanced using a fringing field between the working electrode which is a Schottky contact and a semiconductor or heterojunction acting as a gate. With time varying bias, remote gating is also possible.

The method may further comprise creating conditions for energy alignment to facilitate transfer of electrons to molecules or radicals in the electrolyte. The enhancing may use a gated electrode comprising at least one gate and at least one working electrode and a relative bias or voltage between the gate and the working electrode. The size and density of the electrodes may be optimized to get high macroscopic current density. Electrochemistry, electrolysis or electrosynthesis may be performed using the method.

The present invention also discloses an electrochemical or photo-electrochemical cell using the gated electrode to reduce overvoltages. The cell may have gated electrodes to reduce overvoltages at both an anode and a cathode of the cell, wherein an electrolytic reaction occurs at one of the electrodes and an electrosynthetic reaction occurs at another of the electrodes. The gate electrode would carry the current needed to produce the gating effect.

BRIEF DESCRIPTION OF THE DRAWINGS

Referring now to the drawings in which like reference numbers represent corresponding parts throughout:

FIGS. 1(a), (b), (c) and (d) are schematics of electrochemical cells for the electrolysis of water, where

FIGS. 2(a) and (b) are band diagrams, wherein

FIGS. 6(a), (b), (c) and (d) show schematic band diagrams along the line $AA_1$ for two bias situations, wherein

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present disclosure is about gated electrodes, wherein an electrode of the electrochemical or photo-electrochemical cell is replaced by an appropriate gated electrode that is comprised of two electrodes, with the gate electrode biased appropriately with respect to the working electrode. The dominant current flow at a gated electrode would be through the working electrode. The gate electrode, which is in proximity of the working electrode, is for the modification of electric charge, field and potential in the electrolyte next to the working electrode. Remote gating with time varying gate voltage is also possible. Gated electrodes could be used for either electrolysis or electrosynthesis, in both aqueous and non-aqueous electrochemical cells, and either one or both electrodes of a cell could be gated electrodes.

Five instances of such structures are illustrated: three made with conductors and insulators and two with semiconductors, insulators and metals with and without polarization engineered structures. These can be used for hydrogen generation either in an integrated photoelectrode system, or just as electrodes for electrolysis independent of the source of the power supply. Similar structures with appropriate materials and bias modifications can be used for the anode, for oxygen evolution, and for other electrochemical applications that could include fuel cells.

Technical Description

Figure 1C:
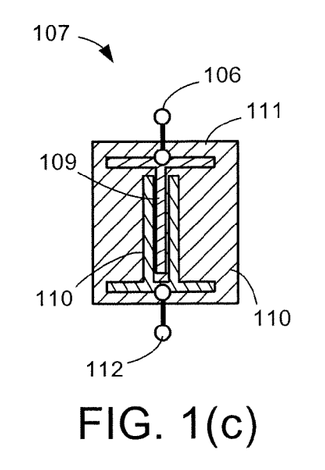
FIG. 1(c) shows the schematic of the face of the cathode for one embodiment of the present invention (just one cathode stripe with adjacent control gate stripes is shown) that might be used in the cell illustrated in FIG. 1(d).
Figure 1D:
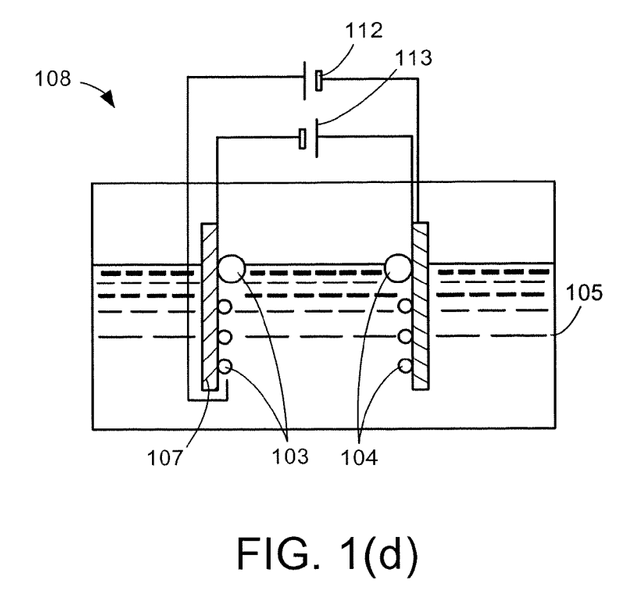

FIG. 1(c) shows the schematic of the face of the cathode (107) (edge view of cathode (107) shown in FIG. 1(d)) for one embodiment of the present invention, that might be used in an electrochemical cell (108) illustrated in FIG. 1(d), showing just one cathode stripe (109) with adjacent control gate stripes (110) on a substrate (111). The present invention replaces at least one electrode (101 or 102) by a pair of electrodes (109 and 110), in which electron transfer occurs at the working electrode (109), while a nearby gate (110) serves to enhance or alter the electric field and electric potential at the interfacial region between the working electrode (109) and the electrolyte (105), when the gate electrode (110) is biased appropriately (112) relative to the working electrode (109). While we show the cross-sections of the electrodes as rectilinear in the figures, they might have other cross-sections and might be nano-structured to increase surface area or fields for electron transfers. The applied voltage is represented by (113) and it might be from a DC or AC source that can supply the required voltage and current. The proposed gated electrode structures can incorporate some of the materials mentioned or other suitable materials and use DC, pulsed or other time-varying bias schemes mentioned above. In addition, the proposed gated electrode structures may use convective effects to mitigate the effects of polarization. Note also that, although the discussion refers to cathodes as the working electrode, the present invention is equally applicable to anodes (with appropriate change of gate material, location and bias). In the following discussion, "cell" is used to refer to either the electrochemical cell or a cell in an electrode array comprising of working and gating electrode structures.

Gated Electrode Structures

The electric charge, field and potential in the electrolyte can be increased by using:
1. coplanar interdigitated electrodes on an insulating substrate with sufficiently small spacing between the electrodes;
2. encircling and/or overlapping gate electrode array(s);
3. gated interdigitated electrodes on semiconductor substrates with and without polarization;
4. stripe electrodes using substrate gated MIM structures;
5. overhanging or suspended working or gate electrodes; and
6. electrodes made on two different substrates and suitably appositioned.

Structures 1 and 2 above create the large field at the cathode by having the gate electrode in close proximity to the working electrode. This can be a considerable technology challenge since large area electrodes with small features have to be created. Structures 3 and 4 above can have a more relaxed patterning requirement.

Coplanar Interdigitated Gated Electrodes on Insulating Substrates

Figure 3A:
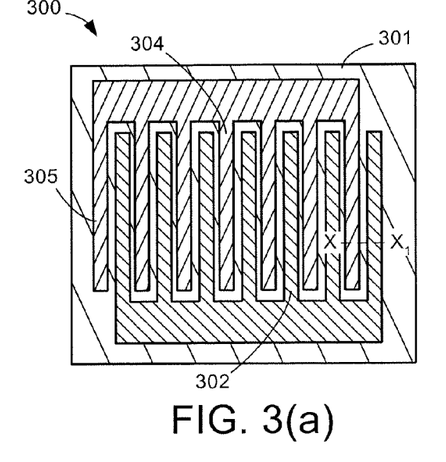
FIGS. 3(a) and (b) show plan and elevation views, respectively, along $XX_1$ of a coplanar interdigitated gated electrode on an insulating substrate, wherein the gate may or may not be coated with a dielectric, and the electric charge, field and potential are modified on some surfaces of the cathode. The concept is illustrated with the working cathode being a linear stripe, however, the concept would also work with electrodes of other shapes, such as zig-zags or meanders or chevrons, with electrodes having more complex cross-sections than the rectilinear cross-sections depicted, including the possibility of the gate electrode overhanging the working electrode or vice-versa.
Figure 3B:
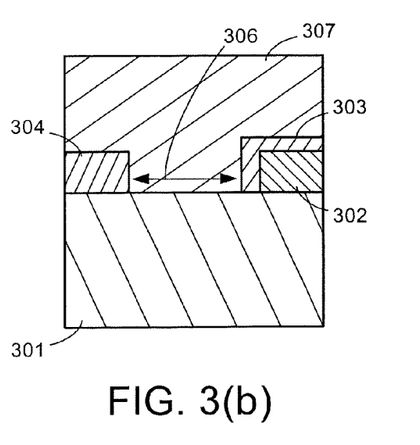

FIGS. 3(a) and (b) show plan and elevation views, respectively, along $XX_1$ of a coplanar interdigitated gated electrode (300) on an insulating substrate (301). The coplanar interdigitated gated electrode (300) comprises a gate electrode (302), which may or may not be coated with a dielectric (303), interdigitated with a working electrode (304) (a cathode, for example). The electric charge, field and potential are modified along surfaces of the cathode (304). The concept is illustrated with the working cathode (304) being a linear stripe (305), but the concept would also work with electrodes of other shapes, such as zig-zag, meanders or chevrons. Further, the electrodes might have other cross-sections. The electrodes (302) and (304) can be made on low cost insulating substrates (301), such as glass or plastic. The sketch of the structure shows how in this case the close spacing (306) of the electrodes (302) and (304) can enhance fields along the periphery of the working electrode (304).

The working electrode (304) comprising, for example, a cathode, could be an appropriate conductor (such as a metal, a conducting polymer, semiconductor, or printed carbon/graphite, or other appropriate electrode material) and may be covered by a thin layer of nano-particles/tubules that increases the working electrode's (304) surface area and possibly also the working electrode's surface field. The gate (302) is made of a conducting material and may or may not be covered by a dielectric (303) that prevents ionic or electronic current from flowing to the gate (302).

The electrodes (302) and (304) need to be closely spaced with sufficiently small spacing (306) such that the electric charge, surface field and potential at the working electrode is modified. By applying a gate potential relative to the working electrode (304) (the cathode in this case), the present invention can modify the charge, field and potential at the cathode (304) and increase electron emission from the electrode (304) to states in the electrolyte (307), thereby facilitating electrochemical, electrolytic, or electrosynthetic reactions in the electrolyte. To get high macroscopic current densities, the present invention needs to have narrow fingers (305) with close spacing (306) such that inactive regions cover a relatively small area.

Encircling and/or Overlapping Gate Electrode Array

Figure 4A:
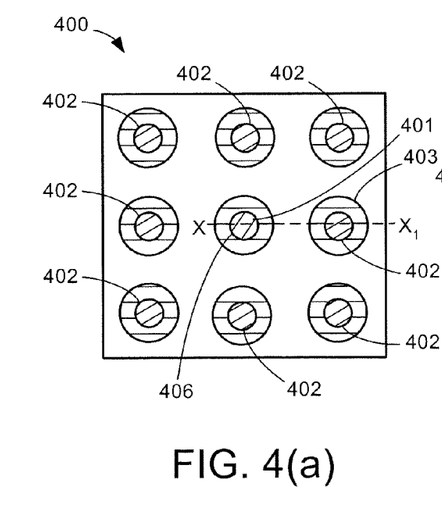
FIGS. 4(a) and (b) show plan and elevation views, respectively, along $XX_1$ of an encircling gate electrode array with a cylindrical working electrode, wherein the electric charge, field and potential are modified on some surfaces of the cathode. While the scheme for a cylindrical working electrode is shown, the concept is applicable for electrodes with arbitrary shapes and cross-sections in each cell of the array. Furthermore, the cells in an array need not be identical.
Figure 4B:
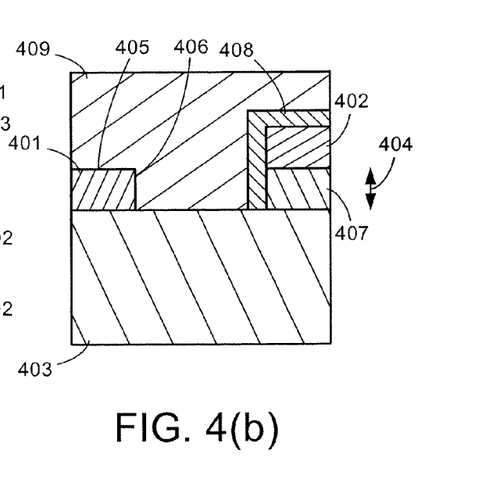

FIGS. 4(a) and (b) show plan and elevation views, respectively, along $XX_1$ of an encircling gate electrode array (400), wherein the electric charge, field and potential are modified on some surfaces of the cathode (401). While the scheme is shown for a cylindrical working electrode (401), the concept is applicable for electrodes with arbitrary shapes and cross-sections in each cell of the array. A cell in this context is a working-electrode/gate-electrode pair. An overlapping structure has a similar configuration. The gate could be overlapping the working electrode areally without being in contact with it and not be just at the side. In fact, that configuration is possible for all the designs of the present invention.

The working electrode (401) and gate electrode (402), made of appropriate conducting materials, could be made on insulating or conducting substrates (403) with the connections for the cathode (401) and gate (402) appropriately separated and insulated from each other. In this case, the cathode (401) is surrounded by gates (402) on all sides and the gates (402) are slightly raised (404) relative to the cathode (401), which modify the electric charge, field and potential on the top (405) (especially the periphery (406)) of the cathode (401). The cathode (401) is made of a conducting material that could be a metal, a conducting polymer, semiconductor, or printed carbon/graphite, or other appropriate materials and could be shaped or covered with a nanostructured material to further enhance surface area and fields. The gates (402) are made of a conducting material, raised on a pedestal (407), and surround the cathode (401) which might be of any shape dictated by processing and design. The gate (402) may or may not be on an insulating pedestal (407). A pedestal (407) is not required when the present invention chooses to use an insulating substrate (403) and patterns the substrate (403) so that the gate (402) is at a higher level (404) than the cathode (401). The gate (403) and may or may not be covered/coated by an insulator/dielectric (408).

Application of appropriate bias between the gate(s) (402) and cathode (401) modifies the electric charge, field and potential at the latter and facilitates the electron transfer and electrochemical reaction. Maximum electric field occurs at the edges of the cathode (401), and size and density of the electrodes (401) have to be optimized to get maximum macroscopic current density. In this case as well, the patterning has to be adequately fine such that the space charge regions of the gate (402) and cathode (401) overlap. FIG. 4(b) also shows the gated electrode (400) immersed in electrolyte (409).

Gated Interdigitated Electrodes on Semiconductor Substrates

This class of gated electrode uses the fringing field that leaks out from the metal and semiconductor of a Schottky contact to modify the electric charge, field and potential in the electrolyte. The concept is shown here for the case of a Schottky barrier, but a heterojunction could also replace the Schottky contact.

Figure 5A:
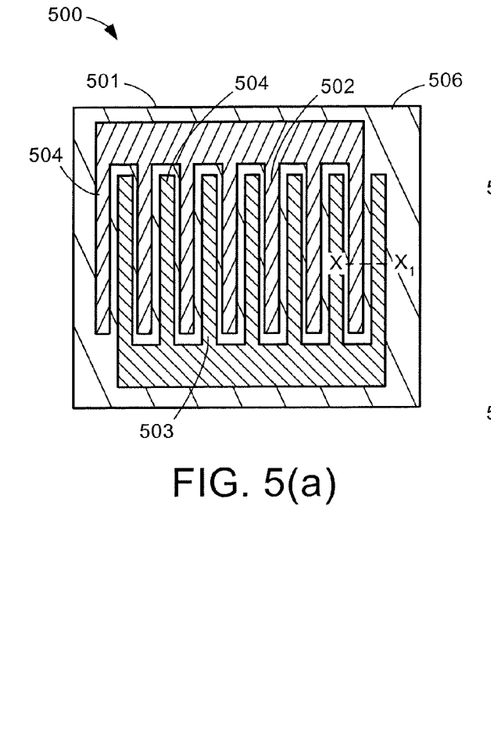
FIGS. 5(a) and (b) show plan and elevation views, respectively, along $XX_1$ of an interdigitated electrode pair on a GaN and AlGaN (or other appropriately chosen semiconductors) structure, wherein the ohmic contact might be covered by an insulator and one might have an insulating layer below the metal that forms the Schottky contact (the concept is illustrated with the working cathode being a linear stripe, but the concept would also work with electrodes of other shapes, such as zig-zags or meanders or chevrons, plus electrodes could have other cross-sections than the ones depicted).
Figure 5B:
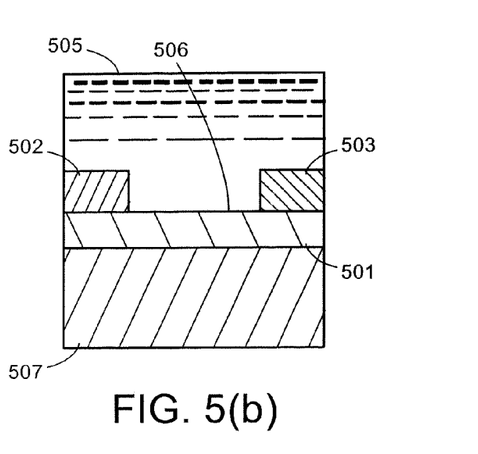
Figure 6A:
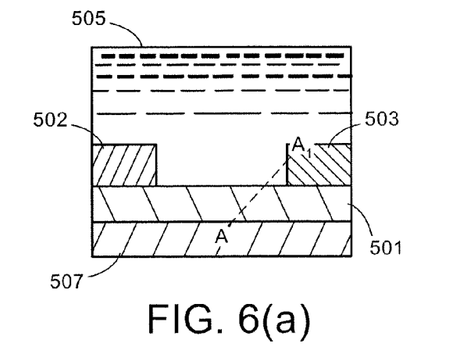

One embodiment of the new concept proposed is illustrated with the structure schematic in FIGS. 5(a) and (b), and the band diagrams in FIGS. 6(a), (b), (c) and (d).

FIGS. 5(a) and (b) show plan and elevation views, respectively, along $XX_1$ of an interdigitated electrode pair (500) on a GaN and AlGaN encapsulation structure (501). The interdigitated electrode pair (500) comprises a gate electrode (501) interdigitated with a working electrode (503). The gate (501), with its ohmic contact (502), might be covered by an insulator, and the present invention might have an insulating layer below the metal (503) that forms the Schottky contact with the semiconductor. The concept is illustrated with the working cathode (503) and gate (501) comprising linear stripes (504), but the concept would also work with electrodes (501, 503) of other shapes, such as zig-zags, meanders, or chevrons, with electrodes having other cross-sections besides the one shown.

FIGS. 5(a) and (b) show the case of the semiconductor (501) being polarized. However, it should be possible to use a non-polarized semiconductor, that is appropriately doped, to get the charge distribution required to achieve required field and potential at the edges of the metal/conducting material (503) that forms the Schottky contact.

A semiconductor heterostructure (501) and an interdigitated electrode array (500) may be used to create conditions either for energy level alignment and/or high field for transfer of electrons into the electrolyte (505) to the hydronium or other desired radical from the working electrode (503). Polarization engineering may be used to create a two dimensional degenerate electron gas (2DEG) in the semiconductor heterostructure (501) near the surface (506) of the semiconductor heterostructure (501), and at the same time raises the energy of the hydronium level(s) in the electrolyte (505). The semiconductor heterostructure (501) may comprise a GaN or AlGaN structure, for example. Other doping schemes might be used to modify near-surface charge and electric field in the electrolyte (505). One possibility for charge distribution would very high doping near the surface of the semiconductor (501), but not below and along the edge of the metal (503).

An ohmic contact (502) is made to the 2DEG, and a working electrode (503) comprising a Schottky contact is also placed nearby. This creates a high field around the interface of three materials—the encapsulated semiconductor (501), the metal comprising the working electrode (503) and the electrolyte (505). FIG. 5(b) also shows how the encapsulation structure (501) may be deposited on a substrate (507), for example, a sapphire or GaN substrate.

Figure 6B:
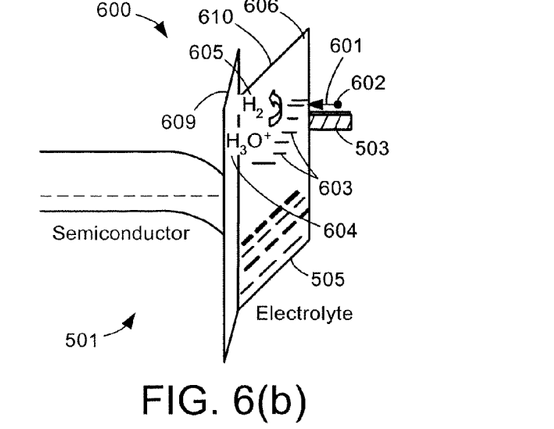
FIG. 6(b) shows the band diagram, along the line $AA_1$, for the Schottky barrier reverse biased with electrons tunneling to the hydronium level from the metal cathode.
Figure 6C:
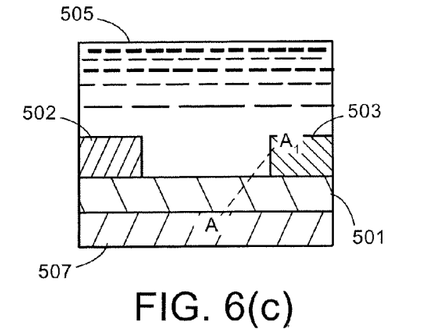
Figure 6D:
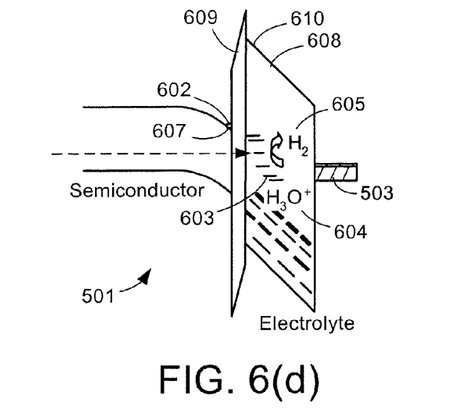
FIG. 6(d) shows the band diagram, along the line $AA_1$ of FIG. 6(c), for the Schottky barrier partially forward biased with the electrons tunneling from the 2DEG as might be desirable for a photocathode (for both these bias conditions, an MIS structure could be used to reduce gate leakage current).

Drawing band diagrams in regions around the interface of the three phases (501), (503) and (505) can be fairly difficult, but sketches of band diagrams along the line $AA_1$ in FIGS. 6(a), (b), (c) and (d) show what is desired. FIGS. 6(b) and 6(d) show schematics of band diagrams along the line $AA_1$ of the interdigitated gated electrode of FIGS. 6(a) and (c), respectively (note that FIGS. 6(a) and 6(c) are the same as FIG. 5(a)). FIGS. 6(b) and 6(d) represent two different bias situations. The scheme facilitates transfer (601) of electrons (602) to energy levels (603) (which may be, for example, levels of radicals such as hydronium (604), or O—H molecular orbital (s)) in an electrolyte (505), such that hydrogen (H)(605) is created or some other electrode reaction effected.

As shown, the present invention shows two bias situations for using the structure:
1. In the first case, the band diagram illustrated in FIG. 6(b) is along the line $AA_1$ in the elevation view of FIG. 6(a). The working electrode (503) is the metal of a Schottky barrier which is reverse biased and would be the configuration best suited for use as a gated cathode. In this case, the field is enhanced on the metal side (i.e. at the interfacial region between the working electrode (503) and the electrolyte (505)) and electrolysis occurs by electron transfer (601) from the metal (503). This will result in increased hydrogen (605) production along the edge of the metal (503) that acts as a Schottky barrier.

2. In the second case, the band diagram illustrated in FIG. 6(d) is along the line $AA_1$ in the elevation view of FIG. 6(c). The Schottky barrier is not biased, or is partially forward biased, and the present invention allows the possibility of tunneling (601) of electrons (602) from the 2DEG (607) to the hydronium (604) for the creation of H (605). This situation could be more appropriate in a photocathode configuration.

The band diagram shows the situation where an insulator or a wide bandgap semiconductor (609) is placed on the semiconductor (501). In an alternative embodiment (not shown), the insulator (609) is between the working electrode (503) and the semiconductor (501), but not between the ohmic contact (502) and semiconductor (501). The ohmic contact (502) may, in some cases, also act as a gate. The semiconductor (501) may be formed on a substrate (507), also shown in FIG. 6(c), which may be an insulator such as sapphire or a semiconductor such as silicon carbide.

In another case, if the ohmic contact (502) is made to the 2DEG and the semiconductor (501), the semiconductor and the 2DEG act as the gate.

The schemes can be modified for electron transfer from the ion/radical (604) in the electrolyte (505) to the working electrode (503), with either the semiconductor (501) or the metal (503) being the anode. From a stability point of view, the present invention would prefer an appropriate metal (503) or semiconductor (501) to be the anode. For both classes of ions (604), the electrodes (503) will require two biases which can be obtained from two different voltage sources or from two photoelectrodes.

Stripe Electrodes Using Substrate Gated MIM Structures

Figure 7A:
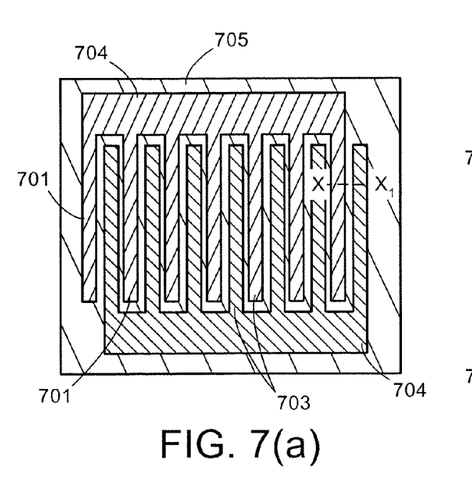
FIGS. 7(a) and (b) show plan and elevation views, respectively, along $XX_1$ of stripe electrodes, wherein the insulator could be a single material or a combination of several materials to enhance the field in the electrolyte (the concept is illustrated with the working cathode being a linear stripe, but the concept would also work with electrodes of other shapes, such as zig-zags or meanders or chevrons and the electrodes could have different cross-sections from the ones depicted).
Figure 7B:
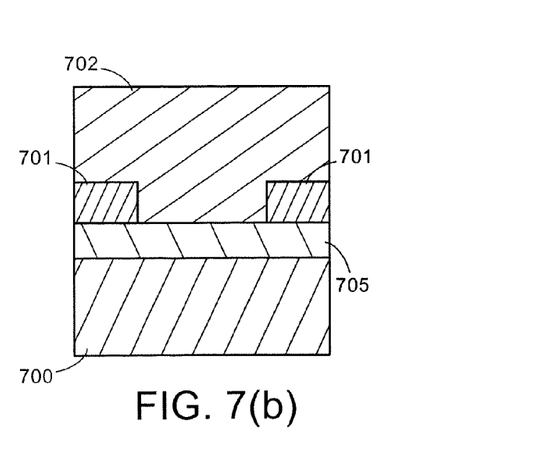

FIGS. 7(a) and (b) show the plan and elevation views, respectively, along $XX_1$ of stripe electrodes. This again uses field enhancement created due to the fringing fields set up by charge in the gate (700). The upper electrode, which is the working electrode (701), in contact with the electrolyte (702) could be an appropriate conductor (a metal, a conducting semiconductor, conducting polymer or printed carbon/graphite, etc.) that is electrochemically stable. The working electrode (701) could be interdigitated stripes (703) with end contacts (704) as shown or could be stripes (703), chevrons or other shapes, connected together at one end only or in a grid (e.g., a mesh). They might have cross-sections that might be different from the rectilinear cross-sections shown.

The substrate metal electrode (700) acts as the gate, and it could be a metal deposited on an insulating substrate. The sandwiched insulating layer or dielectric (705) could be a single material, it could be alternating stripes of low-K (wherein K is dielectric constant) and high-K material, or it could be a more complex combination, such that the fringing field is enhanced in the electrolyte (702) next to the working electrode (701). Again, because of the enhanced field next to the working electrode (701), the electrode overpotential would be reduced.

Electrode Biasing

For all the schemes described above, the gate could be kept biased, or floating, and the bias could be static or time varying, with the specific choice dependent on the electrode process, electrode geometry, and the electrolyte in the cell. The voltage on the working electrode could also be pulsed to reduce the effect of polarization. For example, if the working electrode is a cathode, a time varying/dynamic bias or static bias will affect the electric field at the cathode. Working electrode dynamic biasing helps to modify field specifically at that electrode.

The second electrode for electrolysis could be a normal electrode or another gated electrode with parameters optimized for electrode processes that occur at the anode side, and the second electrode's biasing could either be static or time varying.

Method for Altering Electrochemical Potential and Reducing Overvoltages

FIG. 6(b) shows a method for altering electrochemical potential for electrolytic or electrosynthetic reactions and reducing overvoltages, by modifying the electric field (606) in an interfacial region (610) between the electrolyte (505) and one or more working electrodes (503) to create conditions for energy alignment to facilitate transfer (601) of electrons (602) between the electrode and the electrolyte (505), for example, by applying a relative reverse bias between the working electrode (503) and the gate electrode (502). In FIG. 6(d) the electric field (608) is modified in the interfacial region (610) between an electrolyte (505) and one or more working electrodes (503) by applying no bias (or partial forward bias) between the working electrode (503) and the gate electrode (502). The method is not limited to using the embodiment of FIG. 6, but may use any of the embodiments illustrated in FIGS. 1-7, for example.

The MIM structure of FIG. 7 comprises an insulator (705) sandwiched between two metals (700) and (701). An MIS structure could be formed if the working electrode (701) is a semiconductor rather than a metal. The electric field may be altered at the working electrode by creating a fringing field between the metals of the MIM structure or between the metal and the semiconductor of the MIS structure.

Possible Modifications and Variations

Electrolysis of water has been the context in which the invention has been made. However, the gated electrode idea can be used for other situations in which one requires enhanced field near electrodes in an electrolyte and would be useful in other areas of electrochemistry, including electrosynthesis, electropolymerization, and fuel cells. For example, electrode overvoltage is an issue of concern for fuel cells.

Because the invention was presented in the context of hydrogen generation to instantiate the idea, examples of gated cathodes were discussed, but it should be remembered that the ideas can also be used for gated anodes with appropriate changes of materials and bias. Moreover, a gated cathode and a gated anode could be used in the same electrochemical cell. For example, an embodiment might include a cell with gated electrodes to reduce overvoltages at both an anode and a cathode of the cell, wherein an electrolytic reaction occurs at one of the electrodes and an electrosynthetic reaction occurs at another of the electrodes—an example of such a pair of processes is the fuel cell.

The present invention has also shown that a three electrode system for electrolysis (for example), can also function by interchanging the gate and the anode electrodes (i.e. have the anode and cathode next to each other and have the remote electrode (referred to as the anode in the above discussion) act as the gate. In this case, the anode is the cathode's counter electrode and is the second electrode required for electrolysis. Or, the cathode is the counter electrode for an anode. Thus, any of the electrodes may be interchanged to function either as an anode, cathode, or gate, including a remote gate.

The gated electrode structure may comprise an array of two or more electrodes, for example, working electrodes. More than one electrode may function as a gate, and each of the gates may be at different potentials. More than one electrode may function as a cathode. More than one electrode may function as an anode. Bias applied to any of the electrodes may be steady state, floating, or time varying.

Materials that might be used for the electrode and gate materials include, but are not limited to, metals, semiconductors, polymeric semiconductors, and oxide semiconductors.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device, comprising:
an electrochemical, electrolytic, or fuel cell comprising:
  (a) a first working electrode capable of transferring charge to or from an electrolyte in a first interfacial region, wherein the first interfacial region is in the electrolyte between the first working electrode and the electrolyte;
  (b) a gated electrode assembly comprising a second working electrode and a gate electrode appropriately spaced from the second working electrode, the second working electrode being capable of transferring charge to or from the electrolyte in a second interfacial region, wherein the second interfacial region is in the electrolyte between the second working electrode and the electrolyte; and
wherein:
  (1) the electrochemical, electrolytic, or fuel cell is configured to support a first voltage between the first working electrode and the second working electrode, a second voltage between the second working electrode and the gate electrode, and a current through the first working electrode and the gated electrode assembly
  (2) the current through the gated electrode assembly flows predominately through the second working electrode, and
  (3) the second voltage modifies an electric charge, field, or potential in the second interfacial region, as compared to an electric charge, field, or potential in the electrolyte in the second interfacial region without the gate electrode.

2. The device of claim 1, wherein the gate electrode is a first gate electrode, further comprising a second gate electrode appropriately from the first working electrode.

3. The device of claim 1, wherein the second working electrode is a cathode.

4. The gated electrode structure of claim 1, wherein the device is configured such that the second voltage between the gate electrode and the second working electrode increases charge transfer between the second working electrode and states in the electrolyte.

5. The device of claim 1, wherein the device is configured such that the gate electrode can act as both a gating electrode and a counter electrode.

6. The device of claim 1, wherein the gate electrode encircles the second working electrode.

7. The device of claim 1, wherein the second working electrode or gate electrode are overhanging or suspended.

8. The device of claim 1, wherein the second working electrode and gate electrode are made on two different substrates and suitably appositioned.

9. The device of claim 1, wherein the gate electrode and the second working electrode are coplanar and interdigitated.

10. The device of claim 9, wherein the gate electrode and second working electrode are on a semiconductor material structure.

11. The device of claim 10, wherein the semiconductor material structure is polarized.

12. The device of claim 10, wherein the semiconductor material structure comprises GaN and AlGaN.

13. The device of claim 12, further comprising a two dimensional electron gas in the semiconductor material structure.

14. The device of claim 10, wherein the semiconductor material structure is highly doped near a surface of the semiconductor material structure.

15. The device of claim 10, wherein the semiconductor material structure is a semiconductor substrate.

16. The device of claim 9, wherein the second working electrode comprises one or more stripe electrodes.

17. The device of claim 1, wherein the gate electrode and the second working electrode are separated by an insulating layer to form a Metal-Insulator-Metal (MIM) or Metal-Insulator-Semiconductor (MIS) structure, and the second working electrode is a metal or a semiconductor.

18. The device of claim 1, wherein the device is configured such that the second voltage between the second working electrode and gate electrode is floating, static or time-varying.

19. The device of claim 1, wherein the device is configured such that overvoltages in the electrochemical, electrolytic, or fuel cell are modified by the second voltage between the gate electrode and the second working electrode.

20. The device of claim 1, comprising of an array of two or more of the working electrodes with associated gate electrodes.

21. The gated electrode of claim 1, further comprising a counter-electrode for the second working electrode, positioned to perform electrochemistry, electrolysis or electrosynthesis together with the second working electrode.

22. The device of claim 1, wherein:
a third interfacial region is between the gate electrode and the electrolyte; and
the second voltage, in combination with an overlap of the third interfacial region and the second interfacial region, modify the electric charge, the field, or the potential in the second interfacial region as compared to the electric charge, the field, or the potential in the electrolyte in the second interfacial region without the gate electrode.

23. A method for altering overvoltages and electrochemical, electrolytic, or electrosynthetic reactions in an electrochemical, electrolytic, or fuel cell, comprising:
(a) providing a first working electrode capable of transferring charge to or from an electrolyte in a first interfacial region, wherein the first interfacial region is in the electrolyte between the first working electrode and the electrolyte;
(b) providing a gated electrode assembly comprising a second working electrode and a gate electrode appropriately spaced from the second working electrode, the second working electrode being capable of transferring charge to or from an electrolyte in a second interfacial region, wherein the second interfacial region is in the electrolyte between the second working electrode and the electrolyte; and (c) configuring the electrochemical, electrolytic, or fuel cell to support a first voltage between the first working electrode and the second working electrode, a second voltage between the second working electrode and the gate electrode, and a current through the first working electrode and the gated electrode assembly, wherein the current through the gated electrode assembly flows predominately through the second working electrode, and the second voltage modifies an electric charge, field, or potential in the second interfacial region, as compared to an electric charge, field, or potential in the electrolyte in the second interfacial region without the gate electrode, thereby altering overvoltages and electrochemical electrolytic, or electrosynthetic reactions.

24. The method of claim 23, further comprising using a fringing field between the gate electrode and the second working electrode, which form a Schottky contact or heterojunction, to modify the electric charge, the field, or the potential.

25. The method of claim 23, wherein:
a third interfacial region is between the gate electrode and the electrolyte; and
the second voltage, in combination with an overlap of the third interfacial region and the second interfacial region, modify the electric charge, the field, or the potential in the second interfacial region as compared to the electric charge, the field, or the potential in the electrolyte in the second interfacial region without the gate electrode.

26. A cell, comprising:
a plurality of gated electrodes to reduce overvoltages at both an anode and a cathode of the cell, wherein:
each of the gated electrodes comprises an assembly including a working electrode and a gate electrode appropriately spaced from the working electrode, the working electrode being capable of transferring charge to or from the electrolyte in a first interfacial region, wherein:
(i) the first interfacial region is in the electrolyte between the working electrode and the electrolyte,
(ii) current through the assembly flows predominately through the working electrode,
(iii) a voltage between the working electrode and the gate electrode modifies an electric charge, field, or potential in the first interfacial region, as compared to an electric charge, field, or potential in the electrolyte in the first interfacial region without the gate electrode, and
(iv) one the gated electrodes includes the working electrode that is the cathode and another of the gated electrodes includes the working electrode that is the anode, and
an electrolytic reaction occurs at one of the gated electrodes and an electrosynthetic reaction occurs at another of the gated electrodes.

27. The cell of claim 26, wherein:
a second interfacial region is between the gate electrode and the electrolyte; and
the voltage, in combination with an overlap of the second interfacial region and the first interfacial region, modify the electric charge, the field, or the potential in the first interfacial region as compared to the electric charge, the field, or the potential in the electrolyte in the first interfacial region without the anode gate electrode.

* * * * *